April 28, 1953
C. F. SHOENFELT
2,636,305
FISHING FLOAT
Filed Nov. 10, 1950
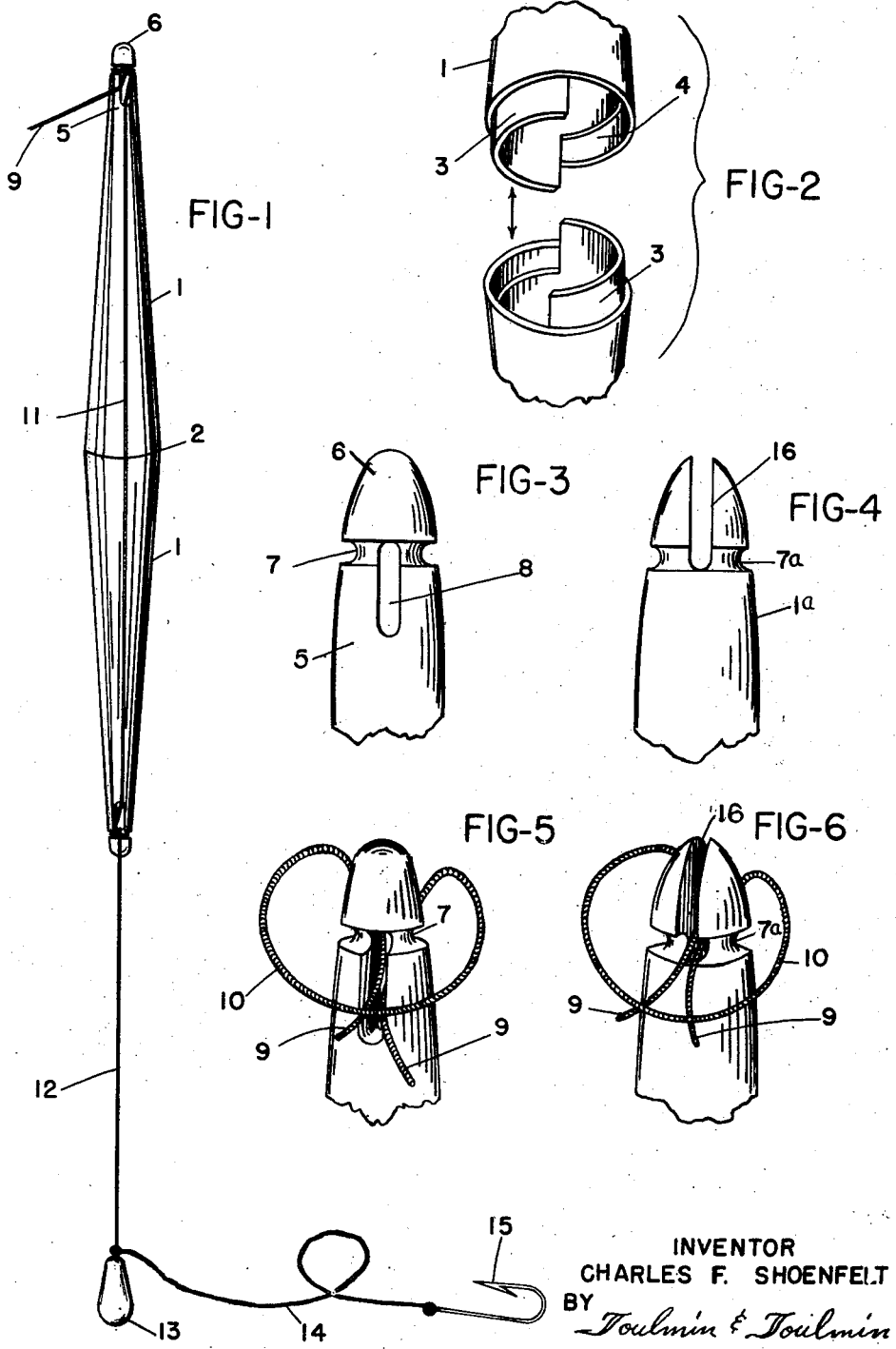
INVENTOR
CHARLES F. SHOENFELT
BY
Toulmin & Toulmin
ATTORNEYS Patented Apr. 28, 1953

2,636,305

UNITED STATES PATENT OFFICE 2,636,305

FISHING FLOAT

Charles F. Shoenfelt, Tipp City, Ohio

Application November 10, 1950, Serial No. 195,080

1 Claim. (Cl. 43—43.1)

The present invention relates to fishing floats.

The multitudinous fishing floats on the market have the disadvantage of being quite expensive so that a person who desires to fish only on occasion, or at an unexpected opportune moment, may not find it expedient to purchase one of these expensive articles. Again, many of the floats are not readily visible in choppy water or at considerable distances, particularly those having a spherical configuration. Still other types of floats present difficulties in attaching and detaching the various lines.

The primary object of the invention is to provide an improved fishing float which is relatively inexpensive but quite effective.

Another object is to provide a float which is readily adapted to receive the sinker and pull lines, without requiring a complicated threading technique.

Still another object is to provide a fishing float which responds over a wide movement to fish bites, and therefore represents a highly sensitive indicator of the presence of fish, observable over considerable distances.

A further object is to provide a hollow float made of moldable material and having a configuration represented by two cones secured together at their bases in rectilinearly opposed relation and will cause the float to stand partially upright in the water. When a fish bites, the pull is sufficient to cause the float to swing through a wide arc and come to a substantially vertical position and the resulting movement can be readily observed even by an inexperienced fisherman.

A further object is to provide a hollow float of plastic having tremendous buoyancy, thus exposing a large portion of the float out of the water which can be readily seen.

The final object is to provide a symmetrical hollow float having solid end portions, with one or both of said portions being adapted to receive the sinker and the pull lines.

The invention will be better understood when reference is made to the following description and accompanying drawings in which:

Figure 1 represents an elevational view of the improved float showing one typical manner in which the sinker and pull lines can be attached thereto;

Figure 2 is a fragmentary showing of the joint between the two end portions of the float, thus indicating the manner in which the float is manufactured and the parts assembled;

Figure 3 is an enlarged elevational view of one of the solid ends of the float, of which both ends are preferably of similar shape and construction;

Figure 4 is a view similar to Figure 3, except showing a different form of construction of the end portions;

Figure 5 depicts the manner in which the lines can be attached to each end of the float illustrated in Figure 3; and Figure 6 similarly depicts the application of the lines to the ends of the float specifically illustrated in Figure 4.

Referring more particularly to Figures 1, 2 and 3, reference character 1 designates a body comprising a conically shaped section or end portion each having a thin wall so as to leave the interior hollow. There are two sections 1 per float, these sections being secured together in a manner to be described at the joint line 2, approximately midway of the length of the float.

The sections or end portions 1 are made of plastic, glass or of any other water impermeable moldable material such as hard rubber. Inasmuch as the wall thickness of the end sections 1 is relatively small so that the contact at the joint line 2 is likewise of small area, it is desirable to form a projection on one of the end sections and a corresponding recess in the other end section in order to obtain sufficient contacting surface to which an adhesive or cement may be effectively applied. Thus, in Figure 2, a downwardly projecting shoulder 3 extending over approximately one-half the circumferential length of the base of the cone is provided during the molding operation, and a circumferential recess 4 is also provided at the diametral position from the projection 3 in order to receive the projection of the base of the adjacently positioned conical section.

For a float of average length, the length of the projection 3 and the depth of the recess 4 may measure about ⅛". A layer (not shown) of adhesive or cement is applied to the abutting surfaces of the two sections including the outer surface of the projections 3 and the edges of the sections at the joint line 2 in order firmly to secure the sections 1 together. This adhesive may be of any suitable and well-known type, depending on the material out of which the sections 1 have been made.

The outermost or extreme ends of the conical sections are constituted of solid portions indicated at 5 and terminate in elliptical or hemispherical tips 6. There is a circumferential groove 7 extending around the solid portion 5, and a short distance from the ends of the float as shown in Figure 3, and in addition there is a transverse slot 8 having its upper end approximately in line with the circumferential groove. This groove and the transverse slot, both of which are located at one end of each conical section, and therefore at both ends of the combined float unit, may be obtained during the molding operation in a manner well known in the art.

The sections 1 preferably are painted with a waterproof paint or enamel and, in order to assist observing the position of the float in the water, one of the sections may be painted or enameled a white color and the other red, with the dividing line at the joint 2.

In utilizing the improved float as made according to Figure 3, the line 9 is first formed in a loop 10 (Fig. 5) and pushed through the slot 8 and by pulling on both lengths of the line 9, the loop can be tightened around the circumferential groove 7 so that the line is secured to the float without any appreciable effort. Assuming that the line 9 is the so-called pull line, one length of this line indicated at 11 may be taken down to the opposite end of the float as seen in Fig. 1, and again formed into a loop to tightly embrace the circumferential groove 7 at the lower end of the float. The line continues as indicated at 12 to a sinker 13 from which a hook line 14 and attached hook 15 extend.

A modified form of the float 1 is shown in Fig. 4 in which the ends of the float 1a are provided with a circumferential groove 7a and there is a transverse open-end slot 16 at each elliptical end, the slot 16 being open completely transversely across the end portion the full length of the slot and to the lowest point of groove 7a as shown in Fig. 4. In Fig. 3 a closed slot construction is shown, while in Fig. 4 an open slot arrangement is illustrated. The same method is employed in threading the float as was explained in connection with Fig. 5, except that the loop 10 can now be passed vertically downward along the sides of the slot instead of being threaded through the slot. As in the other figure, the loop is caused to be tightened around the groove 7a when tension is applied on the lines 9.

While I have described my improved float as having the pull line 9 attached to the upper end and the sinker line 12 secured to the lower end at the position of the slots and grooves, it is to be understood that only one end of the float may, if desired, be used for both the pull line and the sinker line, although I have found it preferable to attach the respective lines to opposite ends of the float. A float made in the manner described lends itself to the use of all kinds of water-impervious material and particularly a plastic such as Bakelite, etc. or hard rubber which can be readily molded in any suitable, well known manner to form the conical sections and yet will provide sufficient buoyancy due to the hollowness of the body.

While I do not wish to be limited to any length or size of float, I have found that a float which is approximately 6½" long and has a diameter of ½" at the joint line 2, tapering down to approximately $\frac{3}{16}$" at each end and having slots 8 of approximately $\frac{5}{16}$" in length, operates quite satisfactorily. As explained hereinbefore, a float of this character is easily threaded by the various lines and is relatively inexpensive to make, since all the operations can be performed during molding and there are no mechanical elements involved other than the molded article itself.

A float of this character tends to settle in the water in an angular position and, due to this position and the fact that the float is relatively long, any small pull at one end will produce a considerable movement at the other end of the float. Due to the detachable manner in which the lines are inserted in the slots 8, 16 and embrace the grooves 7, 7a, respectively, any adjustment can be readily made as to the position of the float with respect to the position of the sinker 13 in order to obtain the best fishing results. The elongated shape of the float and the fact that it enters the water at an angular position due to its conical configuration and the buoyancy inherent in the float, any movements of the latter are readily discernible, even in choppy water and at considerable distances.

I am aware that the invention may be embodied in still other specific forms without departing from the spirit or essential attributes thereof, and I therefore desire the present embodiment to be considered in all respects as illustrative, and not restrictive; reference being had to the appended claim rather than to the foregoing description to indicate the scope of the invention.

Having thus fully described my invention, what I claim as new and desire to secure by Letters Patent is:

A fishing float comprising a hollow plastic body having two identical conical sections, the bases of said sections being secured together in an airtight manner, to form a closed chamber, an end portion extending from each of said sections, each end portion having a circumferential groove therearound and also having a slot positioned transverse to said groove, said slot extending longitudinally from the apex of said section and open completely transversely across the end portion the full length of the slot and to the lowest point of the groove and terminating in said groove and constituting an opening through said end portion, said slot also being open at said apex.

CHARLES F. SHOENFELT.

References Cited in the file of this patent

UNITED STATES PATENTS

| Number | Name | Date |
|---|---|---|
| 240,611 | Redfield | Apr. 26, 1881 |
| 598,441 | Sargent | Feb. 1, 1898 |
| 728,674 | Cook | May 19, 1903 |
| 1,632,502 | Peckham | June 14, 1927 |
| 1,758,886 | Cogito et al. | May 13, 1930 |
| 2,125,718 | Haag | Aug. 2, 1938 |
| 2,220,358 | Storey | Nov. 5, 1940 |
| 2,269,615 | Walker | Jan. 13, 1942 |